US008775679B2

(12) United States Patent
Oka et al.

(10) Patent No.: US 8,775,679 B2
(45) Date of Patent: Jul. 8, 2014

(54) METHOD, DEVICE, AND SYSTEM FOR ISSUING SYNCHRONIZATION MESSAGE

(75) Inventors: Hiroyuki Oka, Kawasaki (JP); Jun Tsuiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 474 days.

(21) Appl. No.: 12/588,915

(22) Filed: Nov. 2, 2009

(65) Prior Publication Data
US 2010/0121984 A1 May 13, 2010

(30) Foreign Application Priority Data

Oct. 31, 2008 (JP) ................................. 2008-282250

(51) Int. Cl.
G06F 15/16 (2006.01)

(52) U.S. Cl.
USPC ........................................ 709/248; 709/247

(58) Field of Classification Search
None
See application file for complete search history.

(56) References Cited

U.S. PATENT DOCUMENTS

| 6,560,700 | B1 * | 5/2003 | Birkler et al. ...................... 713/1 |
| 7,099,337 | B2 * | 8/2006 | Pinto ............................... 370/400 |
| 7,418,650 | B2 * | 8/2008 | Ungermann et al. ........... 714/798 |
| 7,536,591 | B2 * | 5/2009 | Varadarajan et al. ........... 714/15 |
| 7,542,485 | B2 * | 6/2009 | Bingham et al. ............... 370/507 |
| 7,702,743 | B1 * | 4/2010 | Wong ............................... 709/216 |
| 7,818,388 | B2 * | 10/2010 | Arimilli et al. ................ 709/208 |
| 7,827,428 | B2 * | 11/2010 | Arimilli et al. ................ 713/375 |
| 7,941,688 | B2 * | 5/2011 | Sharma et al. ................. 713/502 |
| 8,036,330 | B2 * | 10/2011 | Nelson ........................... 375/356 |
| 8,055,801 | B2 * | 11/2011 | Smith et al. .................... 709/248 |
| 2006/0059270 | A1 * | 3/2006 | Pleasant et al. ............... 709/237 |
| 2010/0118895 | A1 * | 5/2010 | Radulescu ..................... 370/503 |
| 2011/0035511 | A1 * | 2/2011 | Biederman ..................... 709/248 |

FOREIGN PATENT DOCUMENTS

JP 9-190418 7/1997
JP 2003-216595 7/2003

OTHER PUBLICATIONS

Febrizio Petrini et al., "The Case of the Missing Supercomputer Performance: Achieving Optimal Performance on the 8,192 Processors of ASCI Q", SC2003, Nov. 2003, 17 pages.
Paul Terry et al., "Improving Application Performance on HPC Systems with Process Synchronization", Linux Journal, vol. 2004, Issue 127, (Nov. 2004), 2004, 5 pages.
Japanese Office Action issued Nov. 13, 2012 in corresponding Japanese Patent Application No. 2008-282250.

* cited by examiner

*Primary Examiner* — Umar Cheema
(74) *Attorney, Agent, or Firm* — Staas & Halsey LLP

(57) ABSTRACT

Provided is a device for issuing a synchronization message in a large-scaled computing system including an interconnect and a plurality of computing devices that is connected to the interconnect. The interconnect includes a plurality of switches that is connected to each other. The device sends a synchronization message for synchronizing computing processes on the computing devices to all the computing devices at same timing via the switches that are directly connected to any of the computing devices by using a protocol for a general-purpose interconnect.

24 Claims, 7 Drawing Sheets

METHOD, DEVICE, AND SYSTEM FOR ISSUING SYNCHRONIZATION MESSAGE

CROSS-REFERENCE TO RELATED APPLICATION

This application is based upon and claims the benefit of priority of the prior Japanese Patent Application No. 2008-282250, filed on Oct. 31, 2008, the entire contents of which are incorporated herein by reference.

FIELD

The embodiments discussed herein are directed to a synchronization-message issuing device, a synchronization-message issuing system, a synchronization-message issuing method, and a synchronization-message issuing program.

BACKGROUND

It has been known that occurrence of an operating system (OS) jitter decreases an execution efficiency that is a ratio of an effective performance to a peak performance (see Fabrizio Petrini, Darren J. Kerbyson, and Scott Pakin, "The Case of the Missing Supercomputer Performance: Achieving Optimal Performance on the 8,192 Processors of ASCI Q", SC2003). The peak performance is a theoretical computing power of a computer; the effective performance is a practical computing power that is observed when the computer executes an application.

The OS jitter is a phenomenon in which execution of an application is temporarily stopped in a random manner due to processes that are performed by the OS or the like (so-called, "housekeeping processes"). Occurrence of the OS jitter on the computer increases a ratio of a stand-by time (i.e., time when a central processing unit (CPU) is idle) to an application execution time, which remarkably decreases the execution efficiency.

To implement parallel processing, some of supercomputer systems synchronize computers by distributing synchronization messages to the computers. As a technology to prevent a decrease in the execution efficiency in such supercomputer systems, process scheduling is disclosed in, for example, Paul Terry, Amar Shan, and Pentti Huttunen, "Improving Application Performance on HPC Systems with Process Synchronization", *Linux Journal*, Volume 2004, Issue 127 (November 2004), 2004. In the process scheduling, more particularly, the computers on the system are synchronized with each other in such a manner that all the computers perform an application process at the same timing, and then perform the housekeeping process at the same timing.

In the above-described technology, because the computers are connected to each other via a dedicated interconnect, and the synchronization message that is generated based on a dedicated synchronization-message distribution protocol is distributed to the computers, a degree of accuracy in the synchronization among computers is high. However, the system disadvantageously costs higher than a system using a general-purpose interconnect.

If the synchronization message is sent in series to the computers that are connected to each other via the general-purpose interconnect, the last one of the computers receives the synchronization message when a considerable time has passed since the first one of the computers receives the synchronization message. Therefore, the degree of the accuracy in the synchronization is low.

Moreover, the system using the general-purpose interconnect needs a mechanism for maintaining the synchronized state among the computers in case the synchronization message is lost in the course of distribution.

SUMMARY

According to one aspect of the invention, a device issues a synchronization message in a large-scaled computing system including an interconnect and a plurality of computing devices that is connected to the interconnect. The interconnect includes a plurality of switches that is connected to each other. The device sends a synchronization message for synchronizing computing processes on the computing devices, to all the computing devices at same timing via the switches that are directly connected to any of the computing devices by using a protocol for a general-purpose interconnect.

According to another aspect of the invention, a system issues a synchronization message in a large-scaled computing system including an interconnect and a plurality of computing devices that is connected to the interconnect. The interconnect includes a plurality of switches that is connected to each other. The system includes a plurality of first synchronization-message issuing devices that is connected to the switches that are directly connected to any of the computing devices, and a second synchronization-message issuing device that is connected to the first synchronization-message issuing devices. The second synchronization-message issuing device sends a synchronization message for synchronizing computing processes on the computing devices, to all the first synchronization-message issuing devices at same timing. Each of the first synchronization-message issuing devices converts the synchronization message by using a protocol for a general-purpose interconnect upon receiving the synchronization message from the second synchronization-message issuing device, and sends the converted synchronization message to the computing devices via the switches that are connected to the first synchronization message issuing device.

According to still another aspect of the invention, a method for issuing a synchronization message in a large-scaled computing system including an interconnect that includes a plurality of switches connected to each other, and a plurality of computing devices that is connected to the interconnect, the method includes connecting to the switches directly connected to any of the computing devices, and sending a synchronization message for synchronizing computing processes on the computing devices, to all the computing devices at same timing via the switches using a protocol for a general-purpose interconnect.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Exemplary embodiments of the synchronization-message issuing device, synchronization-message issuing system, synchronization-message issuing method, and synchronization-message issuing program according to the present invention are described in detail below with reference to the accompanying drawings. Firstly, one embodiment of the synchronization-message issuing system is described below as a first embodiment.

[a] First Embodiment

Overview of Synchronization-Message Issuing Device (First Embodiment)

Figure 1:
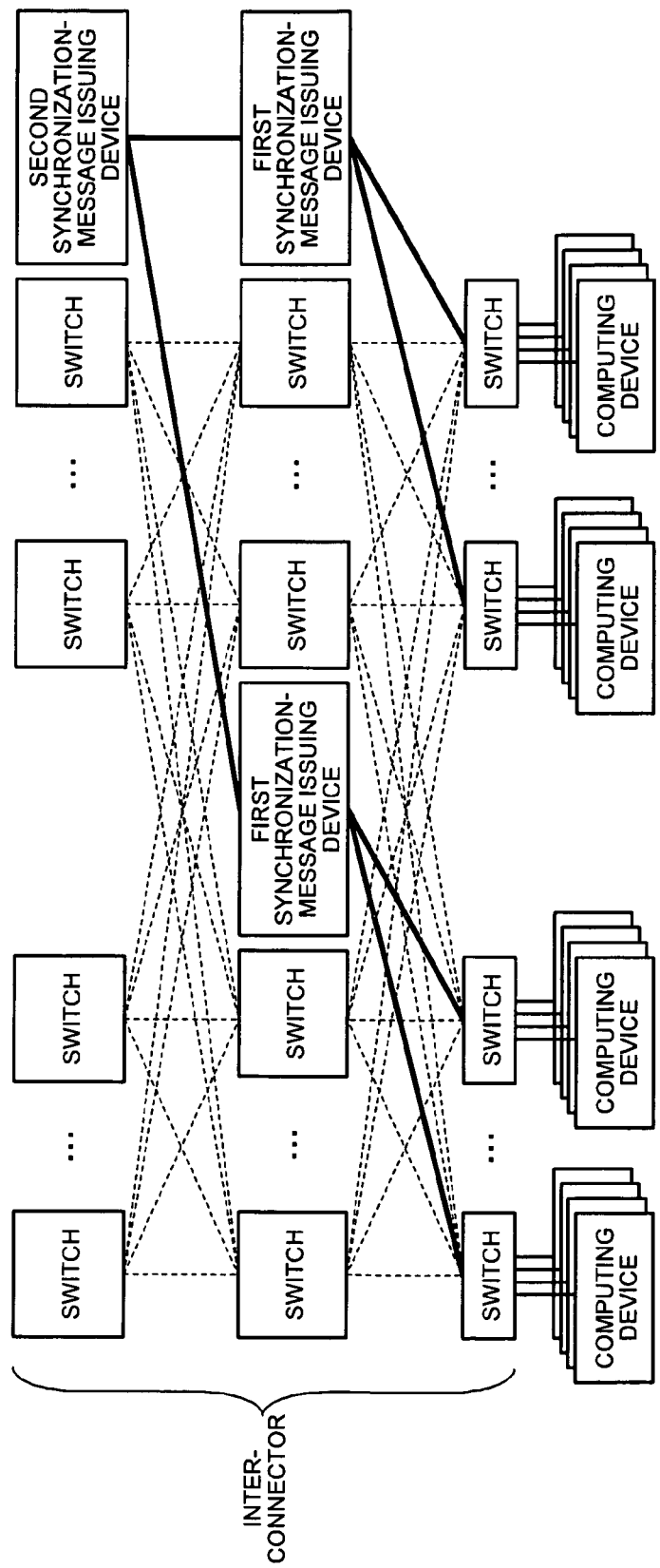
FIG. 1 is a schematic diagram for explaining a synchronization-message issuing system according to a first embodiment of the present invention.

FIG. 1 is a schematic diagram for explaining a synchronization-message issuing system according to a first embodiment of the present invention. The synchronization-message issuing system according to the first embodiment provides a solution to scheduling about processes to be performed on computing devices (e.g., computers) in a large-scaled computing system. The synchronization-message issuing system according to the first embodiment implements highly accurate synchronization among computers without cost increase.

More particularly, as illustrated in FIG. 1, the synchronization-message issuing system according to the first embodiment is applied to a large-scaled computing system including an interconnect and a plurality of computing devices that is connected to the interconnect. The interconnect includes a plurality of switches that is connected to each other. The synchronization-message issuing system according to the first embodiment includes a plurality of first synchronization-message issuing devices and a second synchronization-message issuing device.

The first synchronization-message issuing devices are connected to the switches that are directly connected to the computing devices. The second synchronization-message issuing device is connected to the first synchronization-message issuing devices in such a state that the second synchronization-message issuing device communicates with the first synchronization-message issuing devices.

The second synchronization-message issuing device issues a synchronization message to the first synchronization-message issuing devices at the same timing so that the computing devices can perform the computing process in a synchronized manner. The second synchronization-message issuing device inserts information (hereinafter, "generation value (G value)") to the synchronization message. The G value allows the computing device to uniquely identify a type of process to be performed.

Figure 2:
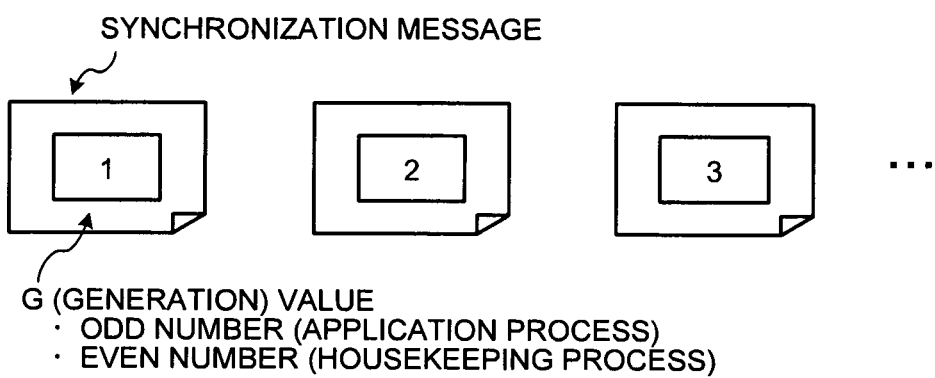
FIG. 2 is a schematic diagram for explaining a synchronization message according to the first embodiment.

The G value is a numerical value that is incremented by one each time the synchronization message is issued as illustrated in FIG. 2. An odd G value indicates that the computing devices are to perform an application process; an even G value indicates that the computing devices are to perform a housekeeping process. FIG. 2 is a schematic diagram for explaining the synchronization message according to the first embodiment.

Upon receiving the synchronization message from the second synchronization-message issuing device, the first synchronization-message issuing devices convert the synchronization message by using a protocol for a general-purpose interconnect, and send the converted synchronization message to the computing devices via the switches.

With this configuration, the synchronization-message issuing system according to the first embodiment synchronizes the computers at high accuracy without cost increase.

[Configuration of Synchronization-message Issuing System (First Embodiment)]

Figure 3:
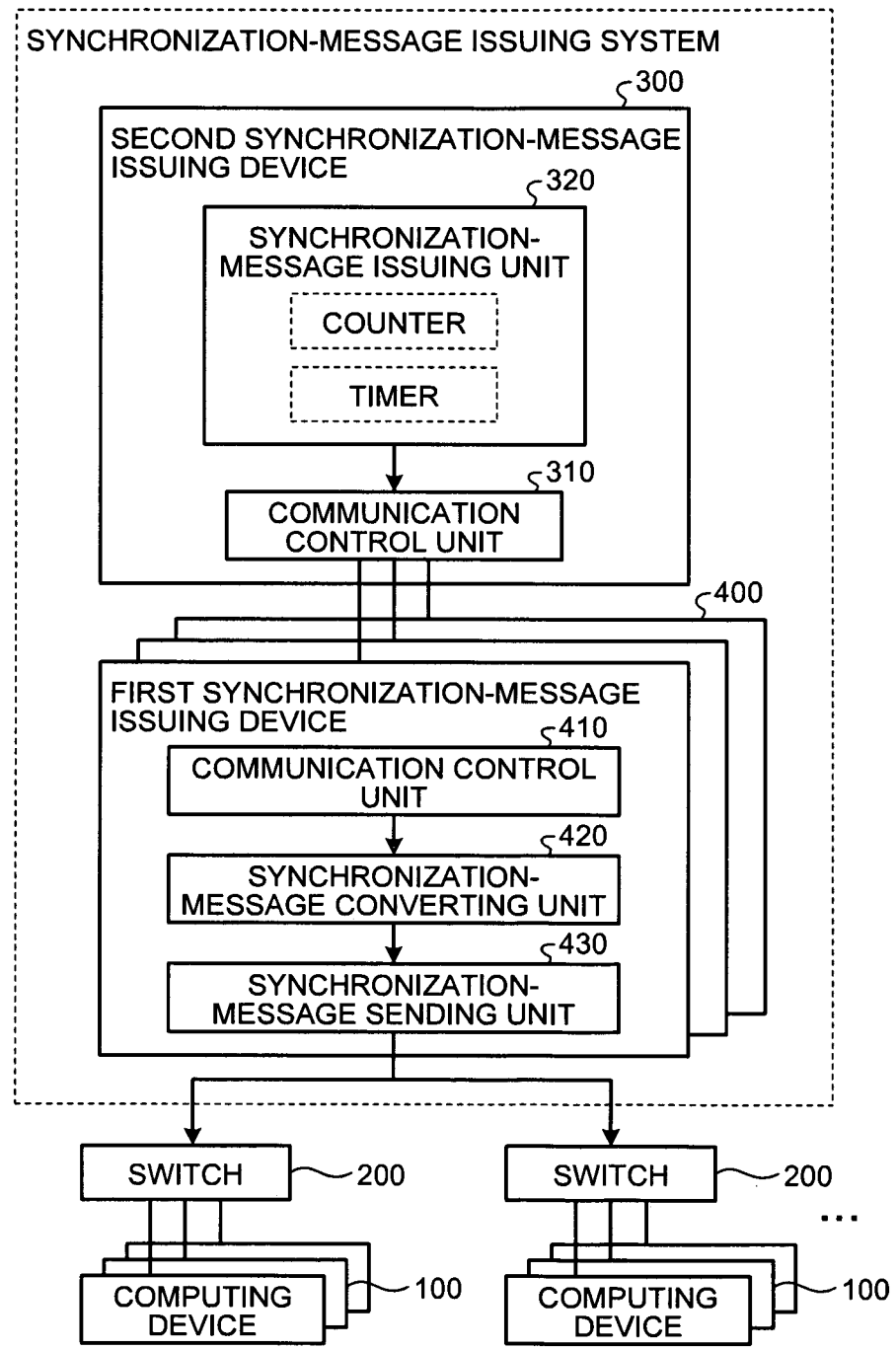
FIG. 3 is a block diagram of the synchronization-message issuing system according to the first embodiment.

FIG. 3 is a block diagram of the synchronization-message issuing system according to the first embodiment. As illustrated in FIG. 3, the synchronization-message issuing system includes first synchronization-message issuing devices 400 and a second synchronization-message issuing device 300.

The second synchronization-message issuing device 300, as illustrated in FIG. 3, includes a communication control unit 310 and a synchronization-message issuing unit 320. The communication control unit 310 controls communications with the first synchronization-message issuing devices 400.

The synchronization-message issuing unit 320 sends the synchronization message to all the first synchronization-message issuing devices 400 at the same predetermined timing so that computing devices 100 can perform the computing process in a synchronized manner. The synchronization-message issuing unit 320 includes a timer and a counter. The synchronization-message issuing unit 320 measures the timing to issue the synchronization message by monitoring the timer. The synchronization-message issuing unit 320 is in a standby state until the timing comes. When the timing comes, the synchronization-message issuing unit 320 reads a current value of the counter, and increments the current value by one. The synchronization-message issuing unit 320 sets the G value to the incremented value, inserts the G value to the synchronization message, and sends the synchronization message to all the first synchronization-message issuing devices 400 at the same timing. In this manner, the synchronization-message issuing unit 320 sends the synchronization message to all the first synchronization-message issuing devices 400 at the same predetermined timing (e.g., at 10-second intervals).

The G value allows the computing devices 100 to identify the type of process to be performed. If the G value is an odd number, the application process is to be performed. If the G value is an even number, the housekeeping process is to be performed. Moreover, the G value allows the computing devices 100 to recognize missing of the synchronization message if any. As a result, the computing devices 100 are synchronized with each other. A process performed by the computing devices 100 will be described later.

The first synchronization-message issuing devices 400, as illustrated in FIG. 3, includes a communication control unit 410, a synchronization-message converting unit 420, and a synchronization-message sending unit 430. The communication control unit 410 controls communications with the second synchronization-message issuing device 300.

Figure 4:
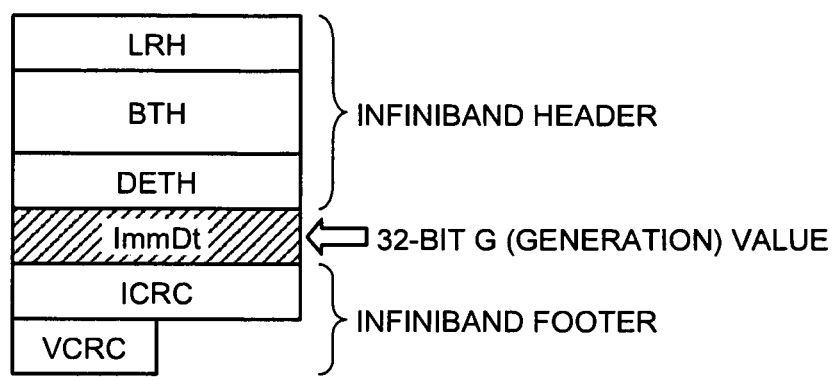
FIG. 4 is a schematic diagram of an exemplary data structure of the synchronization message according to the first embodiment.

Upon receiving the synchronization message from the second synchronization-message issuing device 300, the synchronization-message converting unit 420 converts the synchronization message by using the protocol for the general-purpose interconnect, and sends the converted synchronization message to the synchronization-message sending unit 430. The protocol for the general-purpose interconnect is, for example, an unreliable datagram (UD) of Infiniband. The converted synchronization message has data structure as illustrated in FIG. 4, for example. The G value (32 bits) is included in immediate data (ImmDt). FIG. 4 is a schematic diagram of an exemplary data structure of the synchronization message according to the first embodiment.

The synchronization-message sending unit 430 sends the synchronization message that is received from the synchronization-message converting unit 420 to switches 200.

The switch 200 sends the synchronization message that is received from the first synchronization-message issuing device 400 to the computing devices 100.

Each of the computing devices 100 determines the process to be performed at the current timing by referring to the synchronization message that is received from the switch 200. Thus, the processes are scheduled in such a manner that all the computing devices perform the same type of process, either the application process or the housekeeping process, in the synchronized manner.

More particularly, if receiving the synchronization message including the even G value indicating that the housekeeping process is to be performed while performing the application process, the computing device 100 stops the application process and performs the housekeeping process. If receiving the synchronization message including the odd G value indicating that the application process is to be performed while performing the housekeeping process, the computing device 100 stops the housekeeping process and performs the application process.

If receiving the synchronization message including the G value "3" immediately after receiving the synchronization message including the G value "1", the computing device 100 recognizes missing of the synchronization message including the G value "2". In this case, the computing device 100 continues the execution of the application process. After that, when receiving the synchronization message including the G value "4", the computing device 100 stops the application process, and performs the housekeeping process.

In this manner, the processes are scheduled in such a manner that the computing devices 100 perform the same type of process, either the application process or the housekeeping process, in the synchronized manner.

[Process Performed by Synchronization-Message Issuing System (First Embodiment)]

Figure 5:
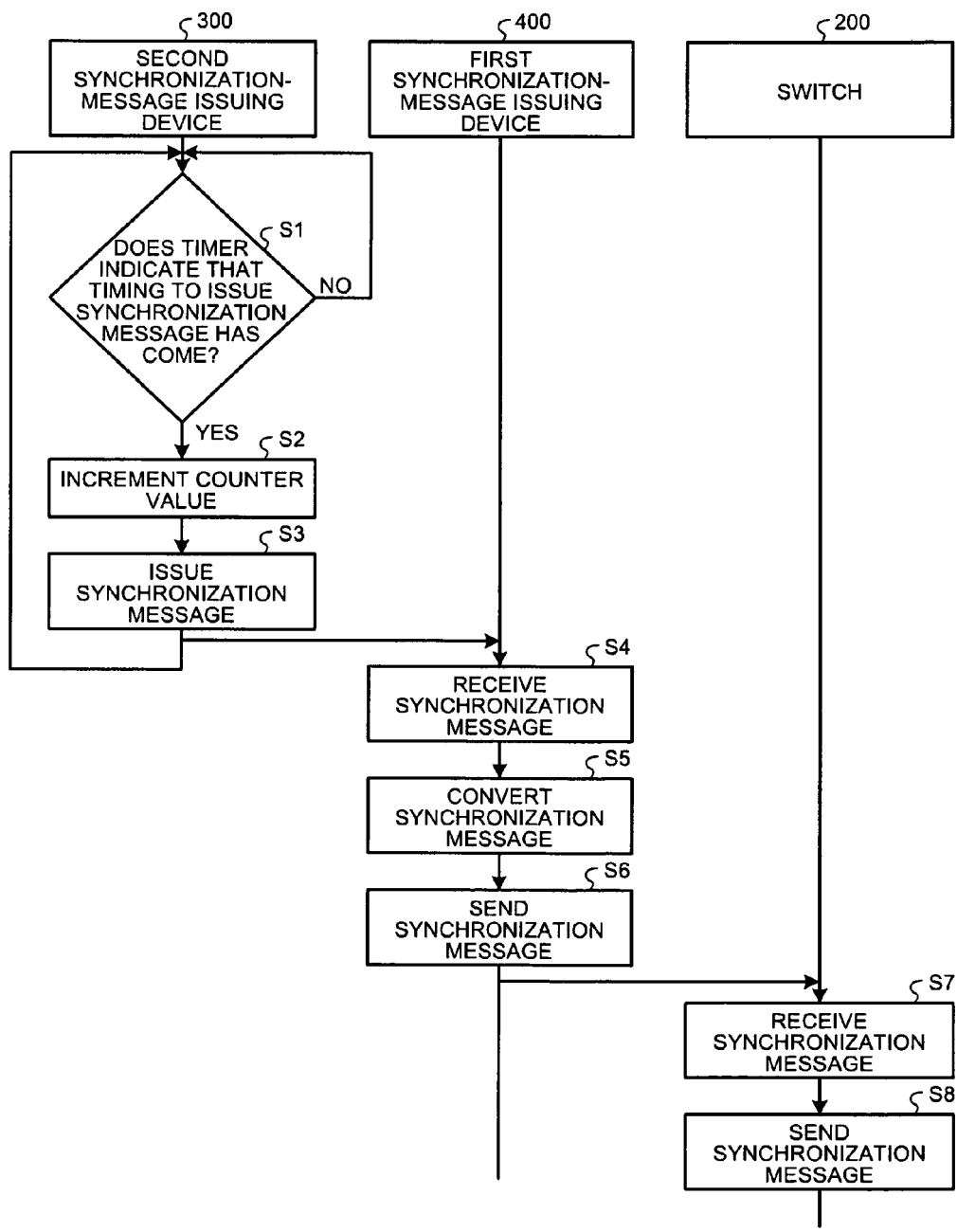
FIG. 5 is a sequence diagram of a synchronization-message issuing process according to the first embodiment.

FIG. 5 is a sequence diagram of a process performed by the synchronization-message issuing system according to the first embodiment. As illustrated in FIG. 5, the synchronization-message issuing unit 320 of the second synchronization-message issuing device 300 monitors the built-in timer to measure the timing to issue the synchronization message, while being in the stand-by state until the timing comes (Step S1).

When the timing to issue the synchronization message comes (Yes at Step S1), the synchronization-message issuing unit 320 reads the current value of the counter, and increments the current value by one (Step S2). The synchronization-message issuing unit 320 sets the G value to the incremented value, inserts the G value to the synchronization message, and sends the synchronization message to all the first synchronization-message issuing devices 400 at the same timing (Step S3).

Upon receiving the synchronization message from the second synchronization-message issuing device 300 (Step S4), the synchronization-message converting unit 420 of the first synchronization-message issuing device 400 converts the received synchronization message by using the protocol for the general-purpose interconnect (Step S5), and sends the converted synchronization message to the synchronization-message sending unit 430. Upon receiving the synchronization message from the synchronization-message converting unit 420, the synchronization-message sending unit 430 sends the received synchronization message to the switches 200 (Step S6).

Upon receiving the synchronization message from the first synchronization-message issuing device 400 (Step S7), the switch 200 sends the received synchronization message to each of the computing devices 100 (Step S8).

In the synchronization-message issuing system according to the first embodiment, as described above, the synchronization message that is converted by using the protocol for the general-purpose interconnect is sent to the computing devices 100. Therefore, the highly accurate synchronization among the computers is implemented.

The G value, which is inserted to the synchronization message by the second synchronization-message issuing device 300, is incremented by one each time the synchronization message is issued in the first embodiment. However, the G value can be set in a different manner as long as the G value allows the computing devices 100 to uniquely identify the type of the process to be performed. For example, it is allowable to alternately set "1" and "0" as the G value.

Although the second synchronization-message issuing device 300 according to the first embodiment sends the synchronization message to all the first synchronization-message issuing devices 400 at the same timing, the synchronization message can be sent in a different manner. For example, the second synchronization-message issuing device 300 may send only the G value to the first synchronization-message issuing devices 400. After that, the first synchronization-message issuing devices 400 may generate the synchronization message by using the protocol for the general-purpose interconnect, insert the received G value to the generated synchronization message, and send the synchronization message to the computing devices 100. Thus, the processing load on the second synchronization-message issuing device 300 in the synchronization-message issuing process becomes low.

In the first embodiment, the second synchronization-message issuing device 300 sends the synchronization message to all the first synchronization-message issuing devices 400 at the same timing, and then the first synchronization-message issuing devices 400 send the received synchronization message to the computing devices 100 via the switches 200. However, the configuration of the system is not limited thereto. For example, the second synchronization-message issuing device 300 can send the synchronization message directly to the computing devices 100 via the switches 200, not via the first synchronization-message issuing devices 400.

A method, a device, and a system for issuing the synchronization message and a computer program product according to other embodiments of the present invention are described below.

[b] Second Embodiment (1) Application of Synchronization-Message Issuing System

Figure 6:
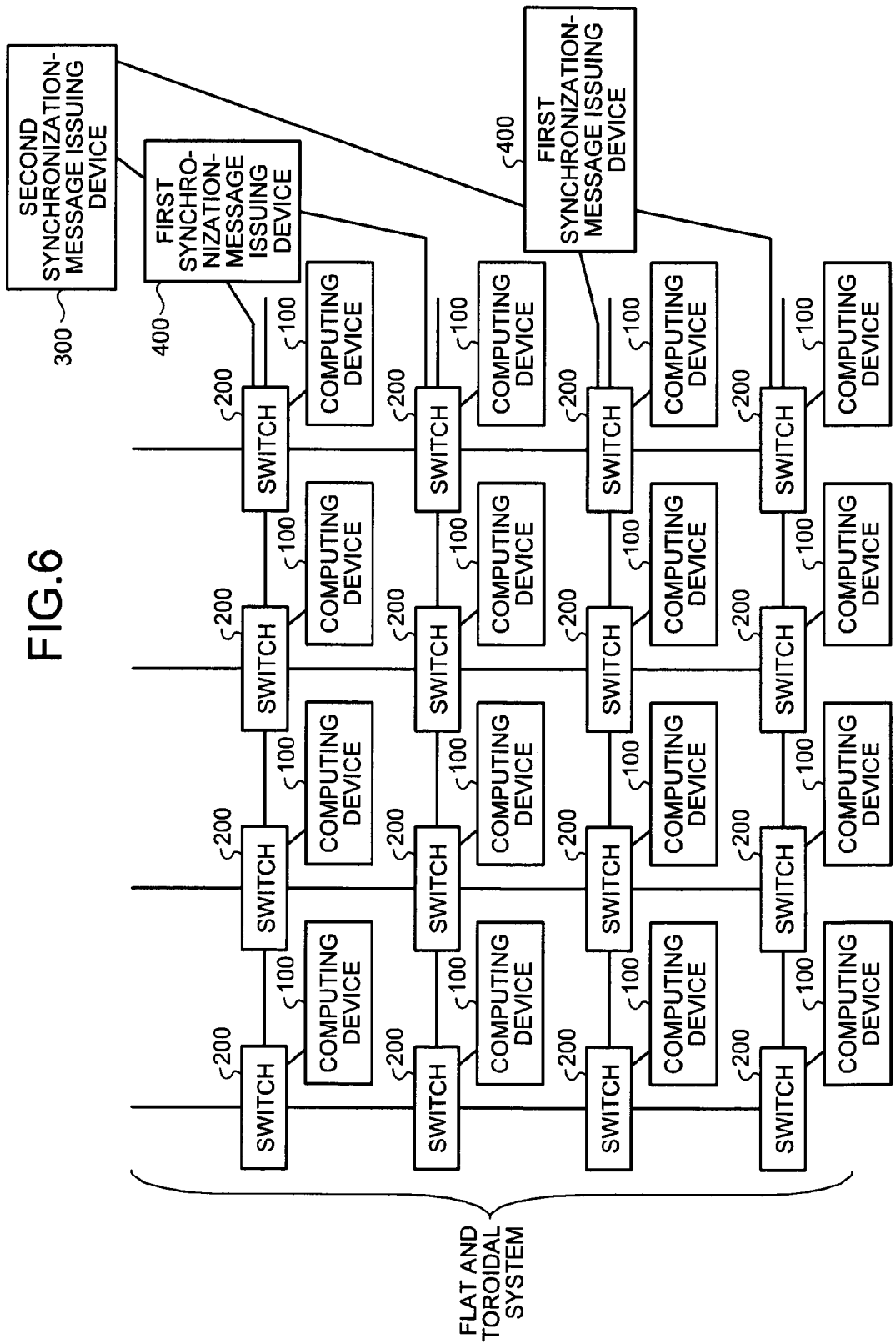
FIG. 6 is a schematic diagram for explaining a synchronization-message issuing system according to a second embodiment of the present invention.

The synchronization-message issuing system according to the first embodiment can be used in a flat system including the switches 200 that are connected to each other in a torus form. The flat system means that the switches 200 are not in a hierarchical relation. For example, one of the switches 200 connected in a row is selected, and the selected switch 200 is connected to the first synchronization-message issuing device 400. When the second synchronization-message issuing device 300 issues the synchronization message, a row of the switches 200 including the selected switch 200 receive the synchronization message via the first synchronization-message issuing devices 400. FIG. 6 is a schematic diagram for explaining a synchronization-message issuing system according to a second embodiment of the present invention.

The flat synchronization-message issuing system using the switches 200 that are connected to each other in the torus form makes it possible to implement the highly accurate synchronization among the computers and improve the scalability of the system configuration.

(2) System Configuration and Others

The configuration of the synchronization-message issuing system illustrated in FIG. 1 is merely conceptual, and the synchronization-message issuing system may not have the physically same configuration illustrated in FIG. 1. For example, the functions of the second synchronization-message issuing device 300 and the first synchronization-message issuing devices 400 may be integrated into one physical unit.

The units of the second synchronization-message issuing device 300 and the units of the first synchronization-message issuing device 400 illustrated in FIG. 3 are merely functional and conceptual, and the second synchronization-message issuing device 300 and the first synchronization-message issuing device 400 may not have the physically same configuration as illustrated in FIG. 3. Specific manner of integration/distribution of the second synchronization-message issuing device 300 and the first synchronization-message issuing device 400 is not limited to those illustrated in the drawings. For example, the synchronization-message converting unit 420 and the synchronization-message sending unit 430 of the first synchronization-message issuing device 400 can be formed as one unit. In this manner, it is allowable to functionally or physically form all the units or a part of the units of the second synchronization-message issuing device 300 or the first synchronization-message issuing device 400 as one unit according to the loads or the usage. Moreover, a part of or all of the processes that are performed by the second synchronization-message issuing device 300 and the first synchronization-message issuing device 400 (e.g., see FIG. 5) can be implemented by using a CPU, a computer program that is executed by the CPU, or a wired logic hardware.

(3) Synchronization-Message Issuing Program

Figure 7:
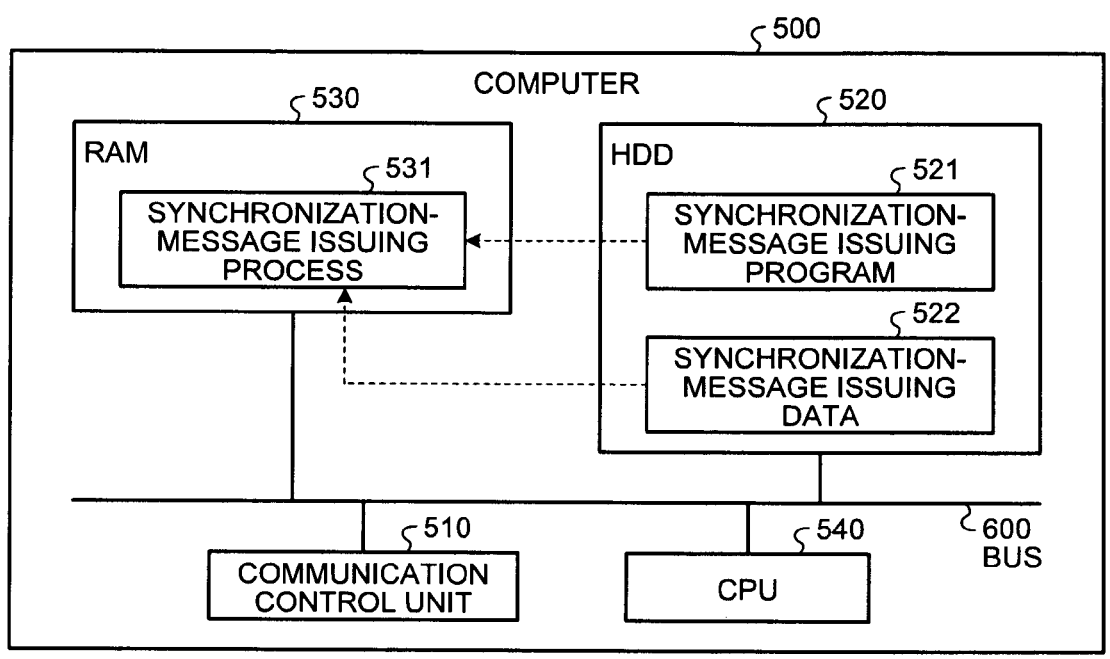
FIG. 7 is a block diagram of a computer that executes a synchronization-message issuing program.

The processes performed by the second synchronization-message issuing device 300 and the first synchronization-message issuing device 400 according to the first embodiment (e.g., see FIG. 5) can be implemented in such a manner that a computer system, such as a personal computer or a work station, executes a predetermined computer program. An example of a computer which executes a synchronization-message issuing program and thereby serving as the second synchronization-message issuing device 300 that is described in the first embodiment is described with reference to FIG. 7. FIG. 7 is a block diagram of a computer 500 that executes the synchronization-message issuing program.

As illustrated in FIG. 7, the computer 500 includes a communication control unit 510, a hard disk drive (HDD) 520, a random access memory (RAM) 530, and a CPU 540 that are connected to each other via a bus 600.

The communication control unit 510 controls sending/receiving of various data to/from other devices. The HDD 520 stores therein data that is used in various processes performed by the CPU 540. The RAM 530 temporarily stores therein various data. The CPU 540 executes various computing processes.

The HDD 520 pre-stores therein, as illustrated in FIG. 7, synchronization-message issuing program 521 and synchronization-message issuing data 522 to allow the computer 500 to work as respective processing units of the second synchronization-message issuing device 300 of the first embodiment. The synchronization-message issuing program 521 can be stored in a storage unit of another computer that is connected to the computer 500 via a network to communicate therewith.

When the CPU 540 reads the synchronization-message issuing program 521 from the HDD 520, and loads the read synchronization-message issuing program 521 on the RAM 530, the synchronization-message issuing program 521 works as a synchronization-message issuing process 531. More particularly, according to the synchronization-message issuing process 531, the CPU 540 reads data including the synchronization-message issuing data 522 from the HDD 520, loads the read data on an assigned area of the RAM 530, and performs the various processes based on the loaded data or the like. The synchronization-message issuing process 531 corresponds to the process that is performed by the units including the synchronization-message issuing unit 320 of the second synchronization-message issuing device 300 illustrated in FIG. 3.

The HDD 520 may not store therein the synchronization-message issuing program 521 in advance. The synchronization-message issuing program 521 can be stored in a portable recording medium that is insertable to the computer 500, such as a flexible disk (FD), a compact disk-read only memory (CD-ROM), a digital versatile disk (DVD), a magneto-optical disk, and an integrated circuit (IC) card or another computer (or server) that is connected to the computer 500 via a public circuit, the Internet, a local area network (LAN), or a wide area network (WAN). The computer 500 reads the synchronization-message issuing program 521 from the portable recording medium or the external computer, and executes the read synchronization-message issuing program 521.

(4) Synchronization-Message Issuing Method

In the large-scaled computing system including the interconnect including the switches that are connected to each other to communicate with each other and the computing devices that are connected to the interconnect, the synchronization-message issuing system as described in the first embodiment implements a synchronization-message issuing method as described below.

According to the synchronization-message issuing method, the synchronization message is sent to all the computing devices at the same timing via the switches that are directly connected to the computing devices by using the protocol for the general-purpose interconnect so that all the computing devices perform the computing process at the same timing (see Step S3 to Step S6 illustrated in FIG. 5, for example).

According to one embodiment of the present invention, highly accurate synchronization among computing devices (computers) is implemented without cost increase.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A device for issuing a synchronization message in a large-scaled computing system performing a plurality of types of computing processes as a parallel processing including an interconnect that includes a plurality of switches connected to each other, and a plurality of computing devices performing the plurality of types of computing processes and being connected to the interconnect, wherein
the device sends a synchronization message including a set value, which is incremented every time the device sends a synchronization message, for synchronizing the computing processes of one of the plurality of types of computing processes on the computing devices, to all the computing devices at same timing via the switches that are directly connected to any of the computing devices by using a protocol for the interconnect, the synchronization message with a predetermined set value being associated with the computing processes of the plurality of types of computing processes to be performed on the computing devices, the one of the plurality of types of computing processes being a housekeeping process, the housekeeping process being a process performed as a periodic system activity and whose execution causes a temporal and random stoppage of execution of an application.

2. The device according to claim 1, wherein the set value includes information which allows the computing devices to uniquely identify the one of the plurality of types of computing processes to be performed on the computing devices.

3. A system for issuing a synchronization message in a large-scaled computing system performing a plurality of types of computing processes as a parallel processing including an interconnect that includes a plurality of switches connected to each other, and a plurality of computing devices performing the plurality of types of computing processes and being connected to the interconnect, the system comprising:
a plurality of first synchronization-message issuing devices that is connected to the switches that are directly connected to any of the computing devices; and
a second synchronization-message issuing device that is connected to the first synchronization-message issuing devices, wherein
the second synchronization-message issuing device sends a synchronization message including a set value, which is incremented every time the second synchronization-message issuing device sends a synchronization message, for synchronizing the computing processes of one of the plurality of types of computing processes on the computing devices, to all the first synchronization-message issuing devices at same timing, the synchronization message with a predetermined set value being associated with the computing processes of the one of the plurality of types of computing processes to be performed on the computing devices, the one of the plurality of types of computing processes being a housekeeping process, the housekeeping process being a process performed as a periodic system activity and whose execution causes a temporal and random stoppage of execution of an application, and
each of the first synchronization-message issuing devices converts the synchronization message by using a protocol for the interconnect upon receiving the synchronization message from the second synchronization-message issuing device, and sends the converted synchronization message to the computing devices via the switches that are connected to the first synchronization message issuing device.

4. A method for issuing a synchronization message in a large-scaled computing system performing a plurality of types of computing processes as a parallel processing including an interconnect that includes a plurality of switches connected to each other, and a plurality of computing devices performing the plurality of types of computing process and being connected to the interconnect, the method comprising:
connecting to the switches directly connected to any of the computing devices; and
sending a synchronization message including a set value, which is incremented every time a synchronization message is sent, for synchronizing the computing processes of one of the plurality of types of computing processes on the computing devices, to all the computing devices at same timing via the switches using a protocol for the interconnect, the synchronization message with a predetermined set value being associated with the computing processes of the one of the plurality of types of computing processes to be performed on the computing devices, the one of the plurality of types of computing processes being a housekeeping process, the housekeeping process being a process performed as a periodic system activity and whose execution causes a temporal and random stoppage of execution of an application.

5. A non-transitory, computer readable storage medium containing program for issuing a synchronization message in a large-scaled computing system performing a plurality of types of computing processes as a parallel processing including an interconnect that includes a plurality of switches connected to each other, and a plurality of computing devices performing the plurality of types of computing processes and being connected to the interconnect, the program causes a computer to perform:
connecting to the switches directly connected to any of the computing devices; and
sending a synchronization message including a set value, which is incremented every time a synchronization message is sent, for synchronizing the computing processes of one of the plurality of types of computing processes on the computing devices, to all the computing devices at same timing via the switches using a protocol for the interconnect, the synchronization message with a predetermined set value being associated with the computing processes of the one of the plurality of types of computing processes to be performed on the computing devices, the one of the plurality of types of computing processes being a housekeeping process, the housekeeping process being a process performed as a periodic system activity and whose execution causes a temporal and random stoppage of execution of an application.

6. The device according to claim 1, wherein the set value allows a computing device which receives the synchronization message including the set value to recognize missing of a synchronization message.

7. The device according to claim 1, further comprising
a timer;
a counter; and
a synchronization message issuing unit that, when a time measured by the timer reaches a predetermined value, increments a value of the counter and sets the value after the increment in the synchronization message as the set value.

8. The device according to claim 2, wherein one of the plurality of types of computing processes to be performed on the computing devices is uniquely identified based on whether the set value is an odd number or an even number.

9. The system according to claim 3, wherein the set value includes information which allows the computing devices to uniquely identify the one of the plurality of types of computing processes to be performed on the computing devices.

10. The system according to claim 3, wherein the set value allows a computing device which receives the synchronization message including the set value to recognize missing of a synchronization message.

11. The system according to claim 3, wherein the second synchronization-message issuing device further includes:
a timer;
a counter; and
a synchronization message issuing unit that, when a time measured by the timer reaches a predetermined value, increments a value of the counter and sets the value after the increment in the synchronization message as the set value.

12. The system according to claim 9, wherein the one of the plurality of types of computing processes to be performed on the computing devices is uniquely identified based on whether the set value is an odd number or an even number.

13. The method according to claim 4, wherein the set value includes information which allows the computing devices to uniquely identify the one of the plurality of types of computing processes to be performed on the computing devices.

14. The method according to claim 4, wherein the set value allows a computing device which receives the synchronization message including the set value to recognize missing of a synchronization message.

15. The method according to claim 4, wherein when a time measured by a timer reaches a predetermined value, a value of a counter is incremented and the value after the increment is set in the synchronization message as the set value.

16. The method according to claim 13, wherein the one of the plurality of types of computing processes to be performed on the computing devices is uniquely identified based on whether the set value is an odd number or an even number.

17. The storage medium according to claim 5, wherein the set value includes information which allows the computing devices to uniquely identify the one of the plurality of types of computing processes to be performed on the computing devices.

18. The storage medium according to claim 5, wherein the set value allows a computing device which receives the synchronization message including the set value to recognize missing of a synchronization message.

19. The storage medium according to claim 5, wherein when a time measured by a timer reaches a predetermined value, a value of a counter is incremented and the value after the increment is set in the synchronization message as the set value.

20. The storage medium according to claim 17, wherein the one of the plurality of types of computing processes to be performed on the computing devices is uniquely identified based on whether the set value is an odd number or an even number.

21. The device according to claim 1, wherein the set value includes information which allows the computing devices to uniquely identify other of the plurality of types of computing processes to stop performing the computing processes of the one of the plurality of types of computing processes for performing the computing processes of the other of the plurality of types of computing processes on the computing devices.

22. The system according to claim 3, wherein the set value includes information which allows the computing devices to uniquely identify other of the plurality of types of computing processes to stop performing the computing processes of the one of the plurality of types of computing processes for performing the computing processes of the other of the plurality of types of computing processes on the computing devices.

23. The method according to claim 4, wherein the set value includes information which allows the computing devices to uniquely identify other of the plurality of types of computing processes to stop performing the computing processes of the one of the plurality of types of computing processes for performing the computing processes of the other of the plurality of types of computing processes on the computing devices.

24. The storage medium according to claim 5, wherein the set value includes information which allows the computing devices to uniquely identify other of the plurality of types of computing processes to stop performing the computing processes of the one of the plurality of types of computing processes for performing the computing processes of the other of the plurality of types of computing processes on the computing devices.

* * * * *